United States Patent
Murata

(10) Patent No.: US 8,827,861 B2
(45) Date of Patent: Sep. 9, 2014

(54) DYNAMIC DAMPER DEVICE

(75) Inventor: Kiyohito Murata, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 256 days.

(21) Appl. No.: 13/377,045

(22) PCT Filed: Oct. 21, 2010

(86) PCT No.: PCT/JP2010/068633
§ 371 (c)(1),
(2), (4) Date: Dec. 8, 2011

(87) PCT Pub. No.: WO2012/053091
PCT Pub. Date: Apr. 26, 2012

(65) Prior Publication Data
US 2012/0220380 A1    Aug. 30, 2012

(51) Int. Cl.
*F16H 3/74* (2006.01)
*B60K 6/485* (2007.10)
*F16F 15/12* (2006.01)
*F16F 15/18* (2006.01)
*B60W 30/20* (2006.01)

(52) U.S. Cl.
CPC ............. *B60K 6/485* (2013.01); *Y02T 10/6226* (2013.01); *F16F 15/1206* (2013.01); *B60W 2030/206* (2013.01); *F16F 15/18* (2013.01); *B60W 30/20* (2013.01)
USPC ........................................................ 475/258

(58) Field of Classification Search
USPC .................... 475/1, 2, 3, 4, 5, 258; 477/1, 5; 464/68.3, 68.8; 74/572.2
See application file for complete search history.

(56) References Cited

U.S. PATENT DOCUMENTS

| 4,732,250 | A | 3/1988 | Maucher et al. |
| 6,308,810 | B1 * | 10/2001 | Kuwayama .................... 188/379 |
| 6,508,343 | B2 * | 1/2003 | Misaji et al. .................. 188/379 |
| 6,682,060 | B2 * | 1/2004 | Kato et al. ..................... 267/141 |
| 7,360,616 | B2 * | 4/2008 | Schiele ....................... 180/65.265 |
| 7,942,749 | B2 * | 5/2011 | Uehara et al. ................ 464/68.8 |
| 2003/0183467 | A1 | 10/2003 | Kozarekar |
| 2009/0007560 | A1 * | 1/2009 | Inoshiri ........................... 60/517 |
| 2011/0245011 | A1 * | 10/2011 | Mochihara .................... 475/230 |
| 2012/0098177 | A1 * | 4/2012 | Satou et al. .............. 267/140.14 |

FOREIGN PATENT DOCUMENTS

| JP | 59 47528 | 3/1984 |
| JP | 7 151186 | 6/1995 |
| JP | 2003 314614 | 11/2003 |
| JP | 2011 226494 | 11/2011 |

OTHER PUBLICATIONS

International Search Report Issued Feb. 1, 2011 in PCT/JP10/68633 Filed Oct. 21, 2010.

* cited by examiner

*Primary Examiner* — Saul Rodriguez
*Assistant Examiner* — David J Hlavka
(74) *Attorney, Agent, or Firm* — Oblon, Spivak, McClelland, Maier & Neustadt, L.L.P.

(57) ABSTRACT

A dynamic damper device includes a variable inertial mass device that variably controls inertial mass of a damper mass, an elastic body that connects a rotary shaft rotated by power transmitted thereto and an input member of the variable inertial mass device, and a variable damping force device that variably controls a damping force to the elastic body. Accordingly, the dynamic damper devices have the advantageous effect that vibrations can be appropriately reduced.

19 Claims, 6 Drawing Sheets

DYNAMIC DAMPER DEVICE

FIELD

The present invention relates to dynamic damper devices.

BACKGROUND

As a conventional dynamic damper device, for example, Patent Literature 1 discloses a mass dynamic damper device for a hybrid vehicle, which exerts control to reduce resonant vibrations by controlling the drive and hence the inertia of an electric motor, and adjusting apparent inertial mass, thereby controlling a resonance point.

CITATION LIST

Patent Literature

Patent Literature 1: Japanese Patent Application Laid-open No. 2003-314614

SUMMARY

Technical Problem

However, the mass dynamic damper device for a hybrid vehicle described in the foregoing Patent Literature 1 needs improvement in, for example, reducing vibrations in a wider range of operating areas.

The present invention has been proposed in view of the foregoing drawback. It is accordingly an object of the present invention to provide dynamic damper devices cable of appropriately reducing vibrations.

Solution to Problem

In order to achieve the above mentioned object, a dynamic damper device according to the present invention includes a variable inertial mass device that variably controls inertial mass of a damper mass; an elastic body that connects a rotary shaft rotated by power transmitted thereto and an input member of the variable inertial mass device; and a variable damping force device that variably controls a damping force to the elastic body.

Further, in the dynamic damper device, it is possible to configure that the dynamic damper device exerts damping control by performing frequency control through inertial mass control exerted by the variable inertial mass device, and amplitude magnitude control through damping force control exerted by the variable damping force device.

Further, in the dynamic damper device, it is possible to configure that the variable damping force device is capable of connecting the rotary shaft and the variable inertial mass device without the elastic body.

Further, in the dynamic damper device, it is possible to configure that the variable inertial mass device has a planetary gear mechanism including a plurality of rotating elements, which are differentially rotatable and a first rotating element of which serves as the input member, and a rotation control device connected to a second rotating element different from the first rotating element and that controls rotation of the second rotating element.

Further, in the dynamic damper device, it is possible to configure that the variable damping force device is capable of connecting a third rotating element different from the first rotating element and the second rotating element, and the rotary shaft.

Further, in the dynamic damper device, it is possible to configure that the variable damping force device has an engaging device capable of frictionally engaging a rotary member on a side of the third rotating element and a rotary member on a side of the rotary shaft and also capable of adjusting the force with which these rotary members engage.

Further, in the dynamic damper device, it is possible to configure that the variable damping force device has a fluid transmission device capable of connecting a rotary member on a side of the third rotating element and a rotary member on a side of the rotary shaft via a fluid and also capable of adjusting a quantity of the fluid.

Further, in the dynamic damper device, it is possible to configure that the variable damping force device is capable of connecting the first rotating element and the rotary shaft without the elastic body.

Further, in the dynamic damper device, it is possible to configure that the rotary shaft is rotated by a power transmitted from an internal combustion engine.

Advantageous Effects of Invention

The dynamic damper devices according to the present invention have the advantageous effect that vibrations can be appropriately reduced.

DESCRIPTION OF EMBODIMENTS

Embodiments according to the present invention will now be described in detail with reference to the accompanying drawings. It is to be understood that the present invention is not limited to these embodiments. Also, it is to be understood that compositional elements in the embodiments described below include ones replaceable with other compositional elements by those skilled in the art or with ones substantially identical to those compositional elements.

First Embodiment

Figure 1:
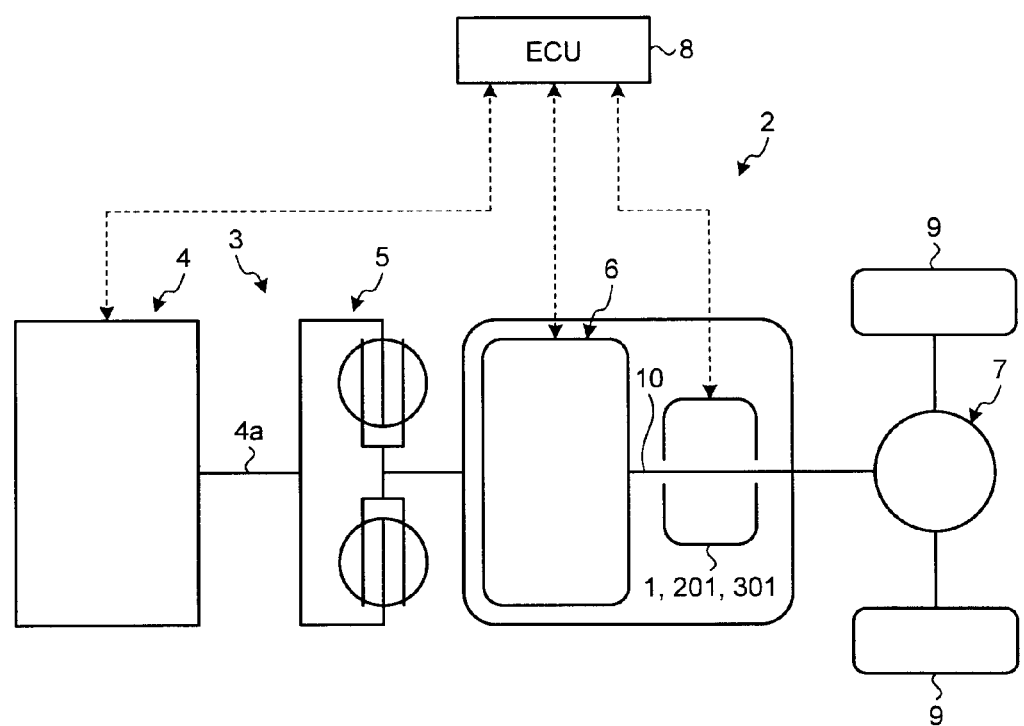
FIG. 1 is a schematic diagram of the configuration of a vehicle incorporating a dynamic damper device according to a first embodiment.
Figure 2:
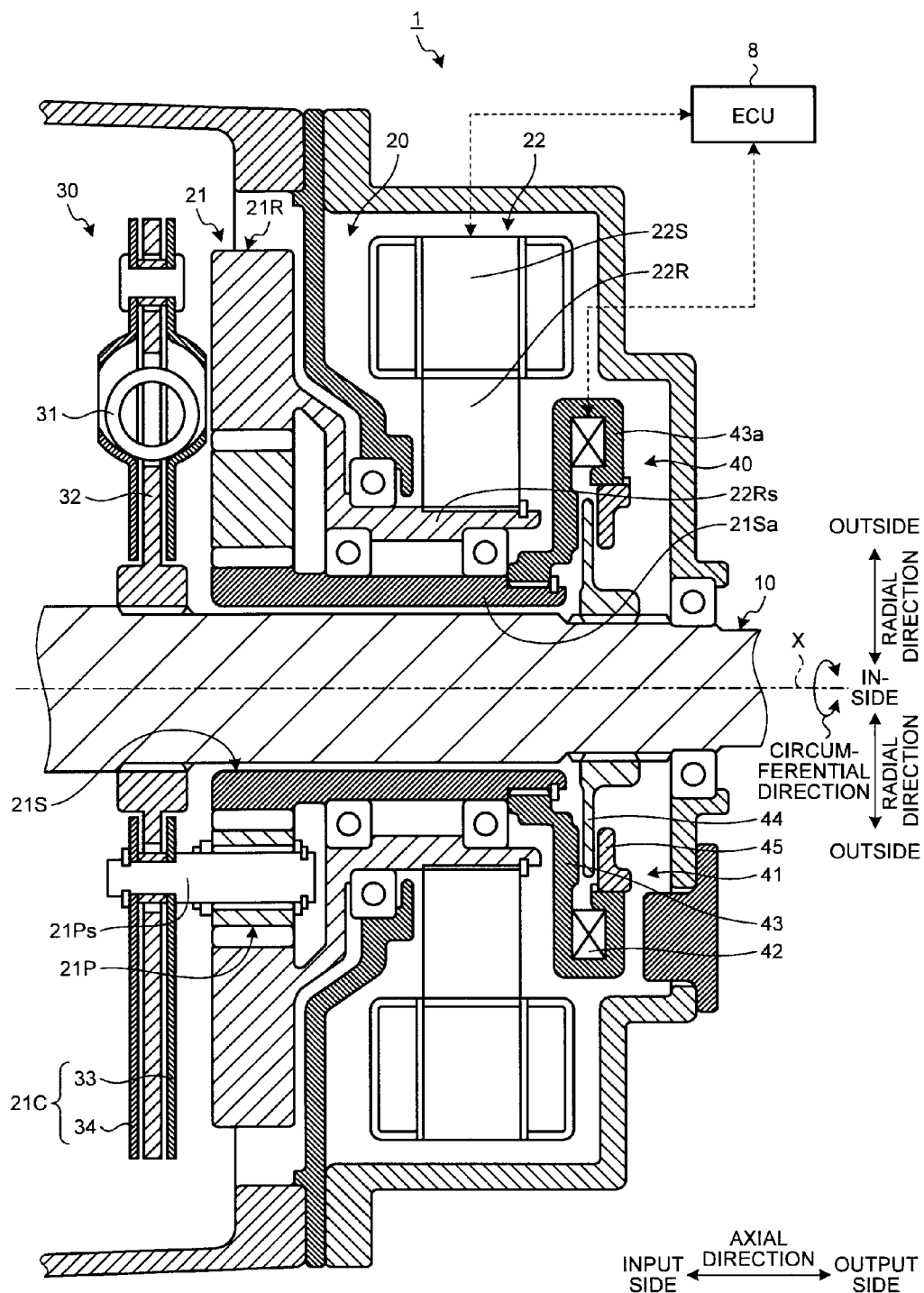
FIG. 2 is a sectional view of the main part of the dynamic damper device.
Figure 3:
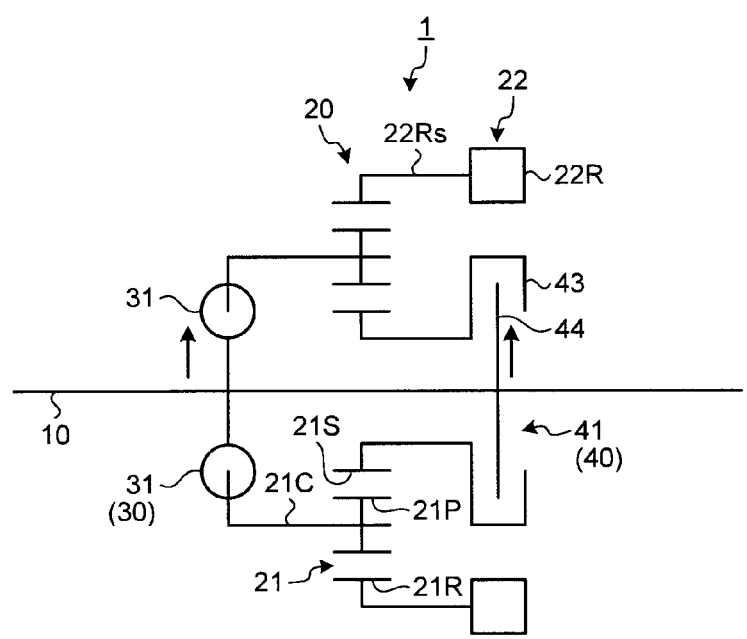
FIG. 3 is a schematic diagram of the configuration of the dynamic damper device.
Figure 4:
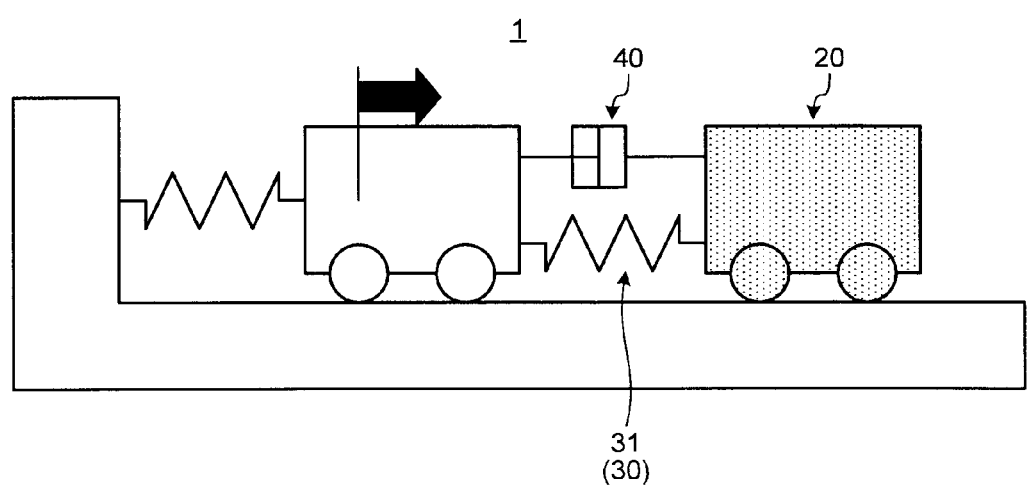
FIG. 4 is a diagram illustrating vibration models of the dynamic damper device.
Figure 5:
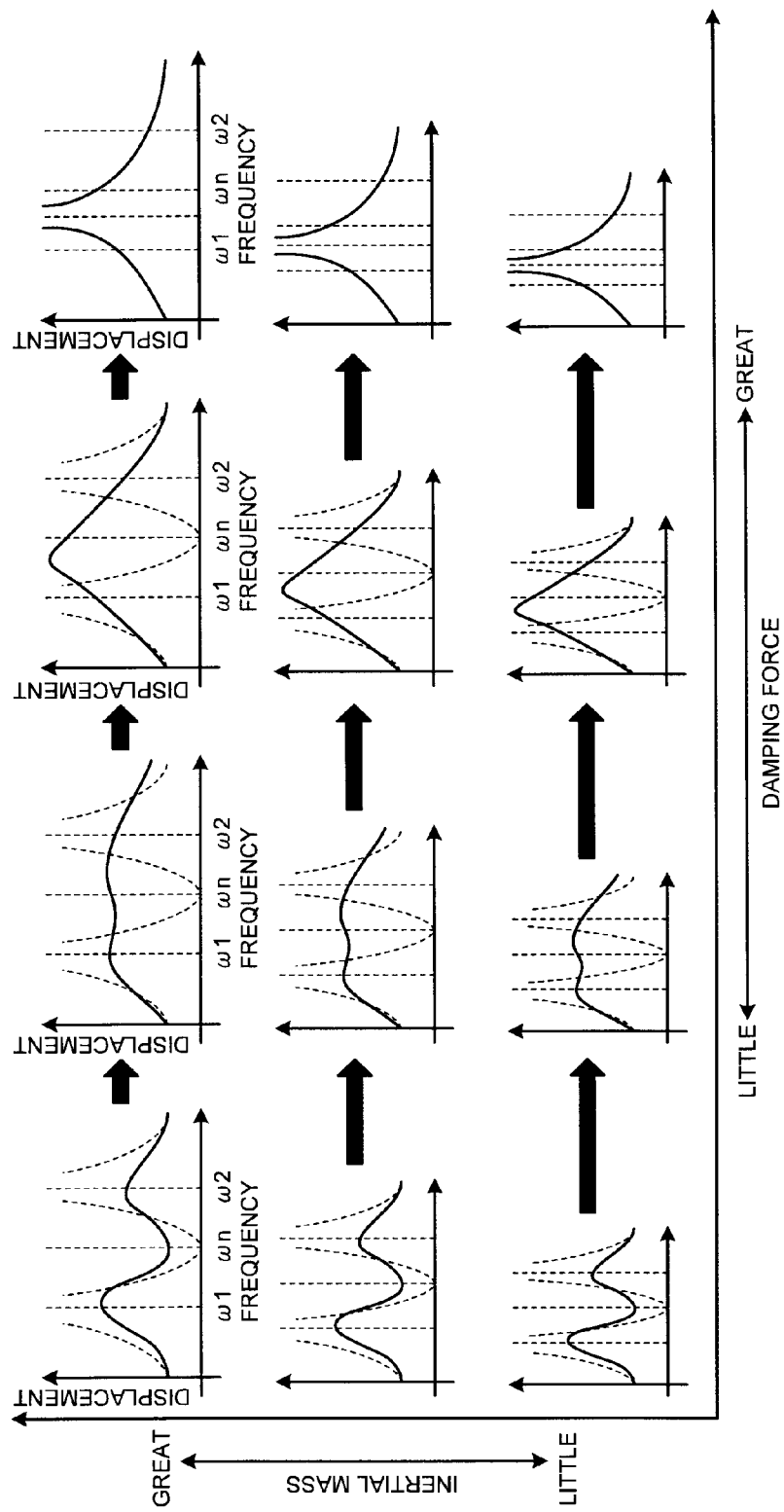
FIG. 5 illustrates schematic graphs illustrating vibration damping for the dynamic damper device.

FIG. 1 is a schematic diagram of the configuration of a vehicle incorporating a dynamic damper device according to a first embodiment, FIG. 2 is a sectional view of the main part of the dynamic damper device, FIG. 3 is a schematic diagram of the configuration of the dynamic damper device, FIG. 4 is a diagram illustrating vibration models of the dynamic damper device, and FIG. 5 illustrates schematic graphs illustrating vibration damping for the dynamic damper device.

In the description below, unless otherwise specified, a direction along the rotation axis X of an output shaft 10 is called an axial direction; a direction intersecting the rotation axis X at right angles, a radial direction; and a direction around the rotation axis X, a circumferential direction. Additionally, the X side on the rotation axis X is called the radial inside, and the side opposite to it is called the radial outside. Furthermore, the side where a drive source is provided in an axial direction (the side where power is input from the drive source) is called the input side, and the opposite side of it, i.e., the side where drive wheels are provided (the side where power is input to the drive wheels) is called the output side.

A dynamic damper device 1 according to the present embodiment is applied in a vehicle 2, as illustrated in FIG. 1, and is a so-called dynamic damper (a dynamic vibration absorber) that reduces vibration using the anti-resonance principle with respect to the resonance point of a power train 3 provided for the vehicle 2. The power train 3 of the vehicle 2 includes, for example: an engine 4 serving as an internal combustion engine, which is a drive source for running; a damper 5; a drive system 6 such as a transmission; and a differential gear 7. The engine 4, the drive system 6, and so on are controlled by an ECU 8, which is a control device. Accordingly, in the vehicle 2, the instant that a crankshaft 4a of the engine 4 is rotated and driven, the drive force is input to the drive system 6 via the damper 5 so as to be subjected to gear change, and transmitted to each drive wheel 9 via the differential gear 7 and so on. As a result, each drive wheel 9 is rotated, thus enabling the vehicle to move forward or backward. The dynamic damper device 1 is provided in the power train 3 and on a rotary shaft, in this case, namely, the output shaft 10 of the drive system 6, which rotates as a result of transmission of power from the engine 4.

As illustrated in FIGS. 2 and 3, a damper mass vibrates in reverse phase to vibrations of specific frequency acting on a dynamic damper device 1, via springs 31 serving as elastic bodies, from the output shaft 10. Thereby the dynamic damper device 1 damps (absorbs) and restrains the vibrations. That is, the dynamic damper device 1 exhibits high vibration damping effect (dynamic damper effect) such that the damper mass resonates with vibrations of specific frequency acting on the dynamic damper device 1 and alternatively absorbs vibration energy, thereby absorbing vibrations.

This dynamic damper device 1 reduces vibration more appropriately by including a variable inertial mass device 20, a spring holding mechanism 30, which holds the springs 31, and a variable damping force device 40. The dynamic damper device 1 is disposed such that the output shaft 10 is inserted in the variable inertial mass device 20, the spring holding mechanism 30, and the variable damping force device 40. In this example, the ECU 8 is used both as a control device for the variable inertial mass device 20 and as a control device for the variable damping force device 40. The output shaft 10, the variable inertial mass device 20, and so on are supported by a case by bearings and so on in specific places. FIG. 4 is a simplified diagram illustrating vibration models when a sine wave force F is applied to the dynamic damper device 1.

In the dynamic damper device 1, the variable inertial mass device 20 with a planetary gear mechanism 21 is configured such that one of a plurality of rotating elements of the planetary gear mechanism 21 is used as a rotation (speed) control element while another rotating element is provided with the aforementioned variable damping force device 40 used as a controllable damping element. In this embodiment, the dynamic damper device 1 uses, as an input element, one of the rotating elements of the planetary gear mechanism 21 other than the rotation control element and damping element.

Specifically, the variable inertial mass device 20 variably controls the inertial mass of the damper mass, and includes the planetary gear mechanism 21 and a motor 22, which is a rotation control device. Generally, in the variable inertial mass device 20, the planetary gear mechanism 21 is elastically supported by its being connected to the output shaft 10 by the springs 31. Thereby each rotating element acts as an inertial mass member for generating inertial moment in the damper mass, namely, the dynamic damper, and the springs 31 act as a member for adjusting the torsional rigidity of the dynamic damper. In the description below, unless otherwise specified, the phrase "to render the inertial mass of the damper mass variable" includes the case where apparent inertial mass is rendered variable by rendering the rotary speed of the damper mass variable.

The planetary gear mechanism 21 includes a plurality of rotating elements, which are differentially rotatable with respect to one another, and the rotation centers of these rotating elements are disposed on the same axis X. The planetary gear mechanism 21 is a so-called single pinion type planetary gear mechanism, and includes the following rotating elements: a sun gear 21S, which is an external gear; a ring gear 21R, which is an internal gear disposed on the same axis as the sun gear 21S; and a carrier 21C holding a plurality of pinion gears 21P, which engage with the sun gear 21S and the ring gear 21R such that the pinion gears 21P are able to rotate on their axes and revolve around the sun gear 21S. In the planetary gear mechanism 21 in the present embodiment, the carrier 21C is a first rotating element and corresponds to the input element mentioned above, the ring gear 21R is a second rotating element, different from the first rotating element, and corresponds to the rotation control element mentioned above, and the sun gear 21S is a third rotating element, different from the first and second elements, and corresponds to the damping element mentioned above.

The carrier 21C has a circular plate shape and supports each pinion gear 21P, which is an external gear, on a pinion shaft 21Ps such that the pinion gear 21P rotates on its axis or revolves. The carrier 21C includes a first side plate 33 and a second side plate 34. The first and second side plates 33 and 34 compose the carrier 21C, and are also used as holding members for holding the springs 31 of a spring holding mechanism 30, which is described below. The carrier 21C serves as an input member for the variable inertial mass device 20. The carrier 21C is connected to the output shaft 10 via the springs 31 of the spring holding mechanism 30, etc., so as to rotate relative to the output shaft 10. Power transmitted from the engine 4 via the spring holding mechanism 30 is transmitted to the carrier 21C. The ring gear 21R has the shape of a circular plate with teeth formed on its internal surface. Connected to the ring gear 21R is the motor 22. The sun gear 21S is cylindrical, with teeth formed on part of its external surface. Connected to the sun gear 21S is a variable damping force device 40.

The motor 22 is connected to the ring gear 21R as mentioned above, and controls rotation of the ring gear 21R. The motor 22 includes a stator 22S, which is a stator, and a rotor 22R, which is a rotor. The stator 22S is fixed to a case or the like. The rotor 22R is disposed radially inside the stator 22S, and is connected to a rotor shaft 22Rs so as to be integrally rotatable. The rotor shaft 22Rs is rotatable integrally with the ring gear 21R. In this example, the rotor shaft 22Rs is formed integrally with the ring gear 21R. The motor 22 is a rotating electrical machine that has functions as an electric motor in converting power supplied from a battery via an inverter into mechanical power, and functions as a generator in converting input mechanical power into electric power. The motor 22 can control the rotation (speed) of the ring gear 21R through rotating and driving the rotor 22R. The ECU 8 controls driving of the motor 22.

In the variable inertial mass device 20 with the foregoing configuration, the ECU 8 controls driving of the motor 22, and variably controls the rotary speed of the ring gear 21R. Thereby, the variable inertial mass device 20 exerts inertial mass control such that the rotary speeds of the ring gear 21R and the sun gear 21S of the planetary gear mechanism 21 are rendered variable and hence inertial force acting on the damper mass including the ring gear 21R, the sun gear 21S, etc., is rendered variable, thereby variably controlling the apparent inertial mass of the damper mass. For example, the variable inertial mass device 20 increases the rotary speed of the ring gear 21R, which is a comparatively large damper mass, thereby increasing the apparent inertial mass of the damper mass such that the same effect is obtained as in the case where the actual inertial mass is increased.

The spring holding mechanism 30 includes, as members for holding this spring 31, a central plate 32, together with the first side plate 33 and the second side plate 34 mentioned above, the central axes of which are disposed on the same axis X. The springs 31 elastically support the carrier 21C, which is the input element of the planetary gear mechanism 21, on the output shaft 10, and are held in a circumferential direction by the central plate 32 and the first and second side plates 33 and 34. The springs 31 connect the output shaft 10 and the carrier 21C so that they are rotatable relative to each other. In other words, in this dynamic damper device 1, the springs 31 are interposed between the output shaft 10 and the planetary gear mechanism 21.

The central plate 32 and the first and second side plates 33 and 34 hold the springs 31 such that power can be transmitted from one to another, and each of the plates has the shape of a circular plate on the same rotation axis X. The central plate 32 is supported on the periphery of the output shaft 10, and the radially inside edge of the central plate 32 is connected to the output shaft 10 via a spline engagement portion or the like such that the central plate 32 and the output shaft 10 are integrally rotatable. The first and second side plates 33 and 34 are disposed one on each side of the central plate 32 in an axial direction, and used as a carrier 21C as well, as described above. The first and second side plates 33 and 34 are integrally provided with the central plate 32 between them via a pin, spacer, etc., such that these side plates are rotatable relative to this central plate 32. One end of the pinion shaft 21Ps is fixed to the first and second side plates 33 and 34. The pinion shaft 21Ps extends through the central plate 32 so as to allow relative rotation of the first and second side plates 33 and 34 and the central plate 32, and the pinion gear 21P is supported so as to be rotatable on its axis. The springs 31 are held between the central plate 32 and the first and second side plates 33 and 34 in a direction of rotation (circumferential direction).

In the spring holding mechanism 30 with the foregoing configuration, the springs 31 are interposed in the direction of rotation (in a circumferential direction) between the central plate 32 that rotates integrally with the output shaft 10 and the first and second side plates 33 and 34 that are used as the carrier 21C as well. Accordingly, the spring holding mechanism 30 is able to connect the output shaft 10 and the carrier 21C via the springs 31, etc., such that the output shaft 10 and the carrier 21C are rotatable relative to each other. When an electromagnetic clutch 41, described below, is not fully engaged, power (a varying constituent) transmitted to the output shaft 10 from the engine 4 is input (transmitted) to the central plate 32 and the first and second side plates 33 and 34 that are used as the carrier 21C via the springs 31. During this period, while held between the central plate 32 and the first and second side plates 33 and 34 in the direction of rotation, each spring 31 is elastically deformed according to the magnitude of the power transmitted thereto.

The variable damping force device 40 variably controls damping force (force restraining from pulling and pressing the spring 31) for the springs 31. Generally, the variable damping force device 40 is able to connect the output shaft 10 and the variable inertial mass device 20 without the springs 31. The variable damping force device 40 in the present embodiment is able to connect the sun gear 21S and the output shaft 10 by virtue of its being connected to the sun gear 21S, as described above.

Specifically, the variable damping force device 40 has the electromagnetic clutch 41, which serves as an engaging device. The electromagnetic clutch 41 includes an electromagnetic coil 42, a sun gear side rotary member 43, an output shaft rotary member 44, and a pressing piston 45. The electromagnetic clutch 41 is able to frictionally engage the sun gear side rotary member 43, which is on the side of the sun gear 21S, and the output shaft rotary member 44, which is on the side of the output shaft 10, and also able to adjust the frictionally engaging force.

The electromagnetic coil 42 is supplied with electric current, thereby generating electromagnetic force. The sun gear side rotary member 43 has the shape of a circular plate with an axis identical to the rotation axis X. The sun gear side rotary member 43 is supported on the periphery of an extended portion 21Sa of the sun gear 21S. The radially inside end of the sun gear side rotary member 43 is connected to the sun gear 21S via a spline engaging portion or the like such that the sun gear side rotary member 43 is rotatable integrally with the sun gear 21S. The output shaft rotary member 44 has the shape of a circular plate with axis identical to the rotation axis X. The output shaft rotary member 44 is supported on the periphery of the output shaft 10, and the radially inside end of the output shaft rotary member 44 is connected to the output shaft 10 via a spline engaging portion or the like such that the output shaft rotary member 44 is rotatable integrally with the output shaft 10 and axially movable relative to the output shaft 10. In the electromagnetic clutch 41, the sun gear side rotary member 43 and the output shaft rotary member 44 are rotatable relative to each other. The pressing piston 45 has the shape of a circular plate with an axis identical to the rotary axis X. The pressing piston 45 is supported radially inside a folded end 43a of the sun gear side rotary member 43, opposite the sun gear side rotary member 43 with the output shaft rotary member 44 between them in an axial direction. The radially outside end of the pressing piston 45 is connected to the folded end 43a via a spline engaging portion or the like such that the pressing piston 45 is rotatable integrally with the folded end 43a and movable relative to this end in an axial direction. In the electromagnetic clutch 41 in this example, the sun gear side rotary member 43, the output shaft rotary member 44, and the pressing piston 45 are disposed in that order from the input side to the output side in an axial direction. Drive of the electromagnetic clutch 41 is controlled by the ECU 8.

In the electromagnetic clutch 41, when an electric current is supplied to the electromagnetic coil 42, the pressing piston 45 is attracted to the output shaft rotary member 44 in an axial direction by the electromagnetic force of the electromagnetic coil 42, thereby pressing the output shaft rotary member 44 against the sun gear side rotary member 43. Consequently, in the electromagnetic clutch 41, the output shaft rotary member 44 and the sun gear side rotary member 43 frictionally engage each other by virtue of frictional force generated on the surface where the output shaft rotary member 44 and the sun gear side rotary member 43 are in contact.

At this time, in the electromagnetic clutch 41, the ECU 8 adjusts electric current supplied to the electromagnetic coil 42, thereby adjusting the force with which the sun gear side rotary member 43 and the output shaft rotary member 44 engage. Generally, the electromagnetic clutch 41 is configured such that as electric current supplied to the electromagnetic coil 42 increases, the force with which the pressing piston 45 presses the output shaft rotary member 44 against the sun gear side rotary member 43 and, hence, the engaging force of the output shaft rotary member 44 and the sun gear side rotary member 43 increase. When the engaging force is zero (when no electric current is supplied), the electromagnetic clutch 41 is in a fully released state in which the output shaft rotary member 44 and the sun gear side rotary member 43 are fully disengaged. As the engaging force (electric current supplied) increases, the output shaft rotary member 44 and the sun gear side rotary member 43 are brought via a half-engaged state (slipping state) into a fully engaged state.

The variable damping force device 40 with the foregoing configuration exerts damping force control such that the ECU 8 variably controls the state of engagement in the electromagnetic clutch 41, in other words, the magnitude of the force with which the output shaft rotary member 44 engages the sun gear side rotary member 43, thereby variably controlling damping force for the springs 31. Consequently, in the dynamic damper device 1, the ratio of a spring constituent transmitted to the carrier 21C of the planetary gear mechanism 21 via the springs 31 to a damping constituent transmitted to the sun gear 21S of the planetary gear mechanism 21 without the springs 31 is adjusted for the varying constituent of the power transmitted to the output shaft 10.

In the variable damping force device 40, when the output shaft rotary member 44 and the sun gear side rotary member 43 are in a fully released state, power (clutch torque) transmitted by the electromagnetic clutch 41 is zero and power transmitted to the sun gear 21S of the variable inertial mass device 20 from the output shaft 10 without the springs 31 is zero. As a result, power transmitted to the output shaft 10 acts on the planetary gear mechanism 21, which serves as a damper mass, as a spring constituent via all the springs 31. That is, in the variable damping force device 40, when the electromagnetic clutch 41 is in fully released, damping force for the springs 31 is least.

In the variable damping force device 40, the engaging force may become greater than that in the fully released state, such that the degree of contact between the output shaft 10 and the sun gear 21S of the variable inertial mass device 20 is increased and hence the output shaft rotary member 44 and the sun gear side rotary member 43 are half-engaged. In this case, power transmitted by the electromagnetic clutch 41 increases according to the engaging force of the electromagnetic clutch 41, thereby altering the magnitude of power transmitted from the output shaft 10 to the sun gear 21S of the variable inertial mass device 20 without the springs 31. Consequently, according to the engaging force of the electromagnetic clutch 41, some of the power transmitted to the output shaft 10 acts on the planetary gear mechanism 21, which serves as a damper mass, as a damping constituent without the springs 31, and the remainder acts on the planetary gear mechanism 21 as a spring constituent via the springs 31. That is, in the variable damping force device 40, when the electromagnetic clutch 41 is in a half-engaged state, the damping force for the springs 31 increases with the engaging force of the electromagnetic clutch 41.

In the variable damping force device 40, the engaging force may become greater than that in the half-engaged state, such that contact between the output shaft 10 and the sun gear 21S of the variable inertial mass device 20 is increased and hence the output shaft rotary member 44 and the sun gear side rotary member 43 are fully engaged. In this case, power transmitted by the electromagnetic clutch 41 becomes greatest, and hence power transmitted from the output shaft 10 to the sun gear 21S of the variable inertial mass device 20 without the springs 31 becomes greatest. Consequently, all the power transmitted to the output shaft 10 acts on the planetary gear mechanism 21, which serves as a damper mass, as a damping element without the springs 31. That is, in the variable damping force device 40, when the electromagnetic clutch 41 is in a fully engaged state, the damping force for the springs 31 is greatest.

The ECU 8 is used to control driving each part of the vehicle 2, and is an electronic circuit that includes, as its main component, a known microcomputer including a CPU, ROM, RAM, and an interface. The ECU 8 controls the engine 4, the drive system 6, etc., and also controls driving the motor 22 of the variable inertial mass device 20, and driving the electromagnetic clutch 41 of the variable damping force device 40. Typically, the ECU 8 exerts damping control by performing frequency control through the inertial mass control exerted by the variable inertial mass device 20, and amplitude magnitude control through damping force control exerted by the variable damping force device 40. As a result, the dynamic damper device 1 is able to exert damping control easily with high accuracy, as described below. For example, the dynamic damper device 1 is able to exert highly accurate control such that the efficiency of the power train 3 and suppression of vibration noise are optimal.

In the dynamic damper device 1 with the foregoing configuration, the damper mass vibrates in reverse phase to vibrations of specific frequency acting on the planetary gear mechanism 21, which is the damper mass, from the output shaft 10 via the springs 31. Thereby the damper mass nullifies these vibrations, thus damping (absorbing) and restraining vibration. At this time, the ECU 8 exerts damping control by performing frequency control through the inertial mass control exerted by the variable inertial mass device 20, and amplitude magnitude control through damping force control exerted by the variable damping force device 40. Thereby, vibration in reverse phase in the dynamic damper device 1 is able to be set appropriately according to vibration generated in the power train 3. Accordingly, the dynamic damper device 1 is able to reduce vibration appropriately in a wider range of operating areas.

FIG. 5 is a schematic view in which the vertical axis and horizontal axis indicate inertial mass and damping force respectively, and which illustrates the characteristics of the frequency (the horizontal axis) and the vibration constituent change (the vertical axis) of the output shaft according to the relation between the magnitudes of inertial mass and damping force. In each characteristic diagram, broken lines indicate cases where there is no damping (damping force is zero).

In the dynamic damper device 1, the ECU 8 variably controls the apparent inertial mass of the damper mass of the variable inertial mass device 20 by performing, as control for the number of vibrations, the inertial mass control exerted by the variable inertial mass device 20. Thereby, the dynamic damper device 1 is able to adjust two resonance point frequencies (number of vibrations) $\omega_1$ and $\omega_2$ and the anti-resonance point frequency $\omega_n$ between the resonance point frequencies $\omega_1$ and $\omega_2$, as illustrated in FIG. 5, thereby altering the resonance point for a specific spring constant. For example, the dynamic damper device 1 has a tendency such that the interval between the resonance point frequencies ω1 and ω2 increases as inertial mass increases.

Additionally, in the dynamic damper device 1, the ECU 8 variably controls a damping force for the springs 31 by performing, as control for the magnitude of amplitude, damping force control exerted by the variable damping force device 40. Thereby, the dynamic damper device 1 is able to adjust vibration amplitude, as illustrated in FIG. 5. For example, the dynamic damper device 1 has a tendency such that the amplitude (displacements) at the resonance point frequencies ω1 and ω2 and the amplitude at the anti-resonance point frequency on decreases and increases, respectively, as damping force increases.

As a result, since the ECU 8 exerts damping control by performing frequency control through the inertial mass control exerted by the variable inertial mass device 20, and amplitude magnitude control through damping force control exerted by the variable damping force device 40, the dynamic damper device 1 is able to adjust resonance points, and alter the natural frequency of the dynamic damper device 1 using these. Additionally, depending on vibrations generated in the power train 3, the dynamic damper device 1 is able to control the number of vibrations through the inertial mass control exerted by the variable inertial mass device 20, and the amplitude magnitude through the damping force control exerted by the variable damping force device 40. Therefore, the dynamic damper device 1 is able to decrease amplitude (vibration level) in a predetermined region applicable in a wider range of operating areas. Accordingly, the dynamic damper device 1 is able to suppress vibrations generated in the power train 3 resulting from the primary explosion in the engine, and thus reduce vibration noise and fuel consumption.

Accordingly, for example, even where the number of resonance points increases as a result of installing the power train 3 with the dynamic damper device 1, the dynamic damper device 1 is able simply to exert optimal damping control.

The dynamic damper device 1 according to the present embodiment described above includes: the variable inertial mass device 20 for variably controlling the inertial mass of the planetary gear mechanism 21, which serves as a damper mass; the springs 31 for connecting the output shaft 10 rotated by transmitted power and the carrier 21C serving as an input member for the variable inertial mass device 20; and the variable damping force device 40 for variably controlling a damping force for the springs 31. Accordingly, the dynamic damper device 1 is able to reduce vibration appropriately.

Second Embodiment

Figure 6:
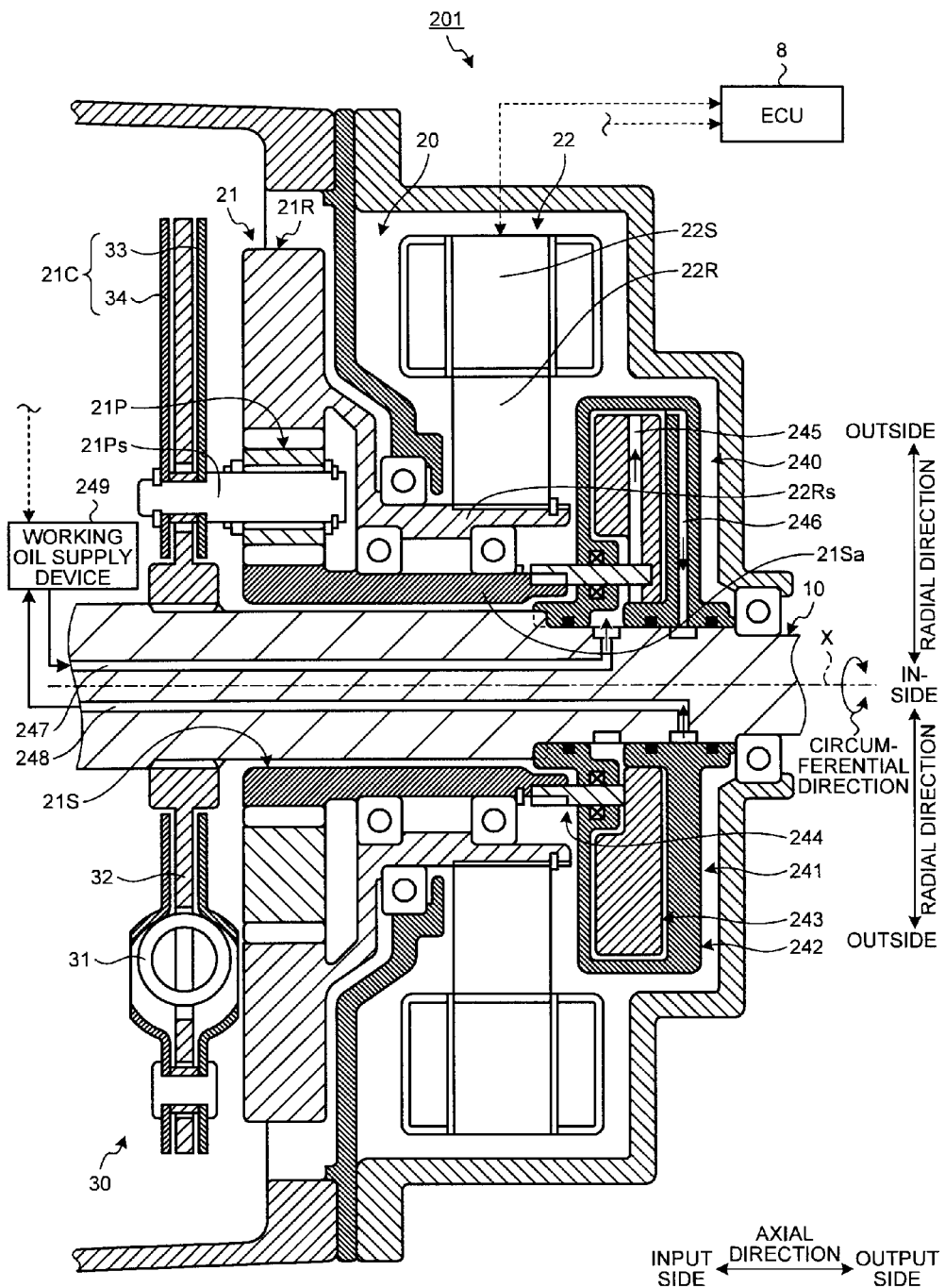
FIG. 6 is a schematic diagram of the configuration of a vehicle incorporating a dynamic damper device according to a second embodiment.

FIG. 6 is a schematic view of the configuration of a vehicle incorporating a dynamic damper device according to a second embodiment. The dynamic damper device according to the second embodiment differs from that according to the first embodiment in respect of the configuration of the variable damping force device. Duplicate descriptions of other features, such as the configuration, operations, and effects common to those in the embodiment described above are minimized (as also in the other embodiment described below).

A dynamic damper device 201 illustrated in FIG. 6 includes the variable inertial mass device 20, the spring holding mechanism 30 holding the springs 31, and a variable damping force device 240, thereby more adequately reducing vibration.

The variable damping force device 240 according to the present embodiment has a fluid transmission device 241. The fluid transmission device 241 includes a housing 242 and a vane 243. The fluid transmission device 241 is a fluid coupling that connects, via a working oil as fluid, the vane 243 serving as a rotary member on the side of the sun gear 21S and a housing 242 serving as a rotary member on the side of the output shaft 10 and that is adjustable a quantity of the working oil. This fluid transmission device 241 is equivalent to a viscosity damping element.

The housing 242 has a cylindrical shape with an axis identical to the rotation axis X. The housing 242 is formed such that both of its axial sides are closed. The housing 242 accommodates the vane 243 therein. The housing 242 is supported on the periphery of the output shaft 10. Also, the radially inside end of the housing 242 is connected to the output shaft 10 via a notch engaging portion or the like such that the housing 242 and the output shaft 10 are integrally rotatable. The vane 243 has the shape of a circular plate with axis identical to the rotation axis X. A cylindrical member 244 with an axis identical to the rotation axis X is connected to the radially inside end of the vane 243 so as to be rotatable integrally with the vane 243. The cylindrical member 244 is supported on the periphery of the extended portion 21Sa of the sun gear 21S, and is connected to the sun gear 21S via a spline engaging portion or the like so as to be rotatable integrally with the sun gear 21S. Thus, the vane 243 is connected to the sun gear 21S so as to be rotatable integrally with the sun gear 21S. In the fluid transmission device 241, the housing 242 and the vane 243 are rotatable relative to each other.

Additionally, in the fluid transmission device 241, seals are formed: between the housing 242 and the output shaft 10; and in the place where the cylindrical member 244 extends through the housing 242, that is, on the internal and external circumferential surfaces of the housing and cylindrical members respectively. Additionally, the vane 243 is provided with an oil passage 245. The oil passage 245 extends through the vane 243 in a radial direction such that its radially outside end is open in the housing 242 whereas its radially inside end is open in the direction of the periphery of the output shaft 10. Another oil passage 246 is formed in the housing 242. The oil passage 246 extends in a radial direction in the housing 242 such that its radially outside end is open inside the housing 242 whereas its radially inside end is open in the direction of the periphery of the output shaft 10. Additionally, oil passages 247 and 248 are formed in the output shaft 10. These oil passages 247 and 248 are formed in the output shaft 10 in an axial direction. One end (the output end) of the oil passage 247 in an axial direction is connected to the oil passage 245, and the other end (the input end), to a working oil supply device 249. One end (the output end) of the oil passage 248 in an axial direction is connected to the oil passage 246, and the other end (the input end), to the working oil supply device 249.

The working oil supply device 249 is used to supply the working oil into the housing 242 or discharge the working oil from inside the housing 242, via the oil passages 245, 246, 247, 248, etc. Basically, the working oil supply device 249 supplies the working oil into the housing 242 via the oil passage 247. The working oil supplied into the housing 242 is discharged via the oil passages 245, 246, and 248. Driving of the working oil supply device 249 is controlled by the ECU 8.

When the working oil is supplied into the housing 242, the fluid transmission device 241 functions as a fluid coupling such that power can be transmitted between the housing 242 and the vane 243 via the working oil, thereby allowing transmission of power between the output shaft 10 and the sun gear 21S.

At this time, in the fluid transmission device 241, the ECU 8 adjusts the quantity of the working oil supplied into the housing 242 from the working oil supply device 249, thereby adjusting the force with which the housing 242 engages the vane 243. Typically, the fluid transmission device 241 supplies the working oil from the working oil supply device 249. As the quantity of the working oil in the housing 242 increases, viscous force and hence the force with which the housing 242 engages the vane 243 increase. On the other hand, the fluid transmission device 241 supplies air from the working oil supply device 249. As the quantity of the working oil in the housing 242 decreases, the viscous force and hence the force with which the housing 242 engages the vane 243 decrease. Generally, when no working oil is present (when only air is present) between the housing 242 and the vane 243, no engaging force acts, resulting in a fully released state in which the housing 242 and the vane 243 are completely disengaged. Then, in the fluid transmission device 241, as the quantity of the working oil between the housing 242 and the vane 243 increases, the housing 242 engages the vane 243 via the working oil according to an engaging force (≈viscous force) corresponding to this quantity.

In a variable damping force device 240 with the foregoing configuration, the ECU 8 exerts damping force control by variably controlling the quantity of the working oil supplied into the housing 242, in other words, the magnitude of the force with which the housing 242 engages the vane 243, thereby variably controlling damping force on the springs 31. Consequently, in the dynamic damper device 201, the ratio of a spring constituent transmitted to the carrier 21C of the planetary gear mechanism 21 via the springs 31 to a damping constituent transmitted to the sun gear 21S of the planetary gear mechanism 21 without the springs 31 is adjusted for the varying constituent of power transmitted to the output shaft 10.

In the variable damping force device 240, if the quantity of the working oil between the housing 242 and the vane 243 is zero, power transmitted by the fluid transmission device 241 is zero, and power transmitted to the sun gear 21S of the variable inertial mass device 20 from the output shaft 10 without the springs 31 is also zero. Consequently, all the power transmitted to the output shaft 10 acts on the planetary gear mechanisms 21, which serves as a damper mass, as a spring constituent via the springs 31. That is, in the variable damping force device 240, if the quantity of the working oil between the housing 242 and the vane 243 is zero (if in a fully released state), damping force for the springs 31 is least.

In the variable damping force device 240, the quantity of the working oil between the housing 242 and the vane 243 may increase compared to that in a fully released state, such that the degree of contact between the output shaft 10 and the variable inertial mass device 20 is increased and hence the housing 242 engages the vane 243 depending on the quantity of the working oil. In this case, according to the quantity of the working oil, in other words, the viscous force (≈engaging force), power transmitted by the fluid transmission device increases, thereby altering the magnitude of power transmitted to the sun gear 21S of the variable inertial mass device 20 from the output shaft 10 without the springs 31. Consequently, depending on the quantity of the working oil, some of the power transmitted to the output shaft 10 acts on the planetary gear mechanism 21, which serves as a damper mass, as a damping constituent without the springs 31, and the remainder acts on the planetary gear mechanism 21 as a spring constituent via the springs 31. That is, in the variable damping force device 240, when the fluid transmission device 241 is in an engaged state, damping force for the springs 31 increases depending on the quantity of the working oil.

In this variable damping force device 240, since the fluid transmission device 241 is a fluid coupling for connecting the housing 242 and the vane 243 via the working oil, the housing 242 and the vane 243 do not engage fully.

The ECU 8 exerts damping control by performing frequency control through the inertial mass control exerted by the variable inertial mass device 20, and amplitude magnitude control through damping force control exerted by the variable damping force device 240. As a result, the dynamic damper device 201 is easily able to exert highly accurate damping control, as described below. For example, the dynamic damper device 201 is able to exert control so accurately that the efficiency of the power train 3 and suppression of vibration noise are optimal.

In a dynamic damper device 201 with the foregoing configuration, the ECU 8 exerts damping control by performing frequency control through the inertial mass control exerted by the variable inertial mass device 20, and amplitude magnitude control through damping force control exerted by the variable damping force device 240. Thereby, vibration in reverse phase in the dynamic damper device 201 is able to be set appropriately according to vibration generated in the power train 3. Accordingly, the dynamic damper device 201 is able to reduce vibrations appropriately in a wider range of operating areas.

In the dynamic damper device 201 according to the embodiment described above, the variable damping force device 240 has a fluid transmission device 241 able to connect the vane 243 on the side of the sun gear 21S and the housing 242 on the side of the output shaft 10 and also able to adjust the quantity of the working oil. Accordingly, the dynamic damper device 201 is able to render damping force for the springs 31 variable, by adjusting the quantity of the working oil supplied to the fluid transmission device 241.

In this dynamic damper device 201, even if the fluid transmission device 241 heats up due to the difference in rotary speed between the output shaft 10 and the sun gear 21S, the working oil circulates in the fluid transmission device 241, thereby adequately cooling the fluid transmission device 241. Accordingly, the dynamic damper device 201 is able to increase the difference in rotary speed permissible between the output shaft 10 and the sun gear 21S, thus increasing the variable range of apparent inertial mass by virtue of the rotation control of the motor 22. As a result, the dynamic damper device 201 is able appropriately to reduce vibration in a much wider range of operating areas.

Third Embodiment

Figure 7:
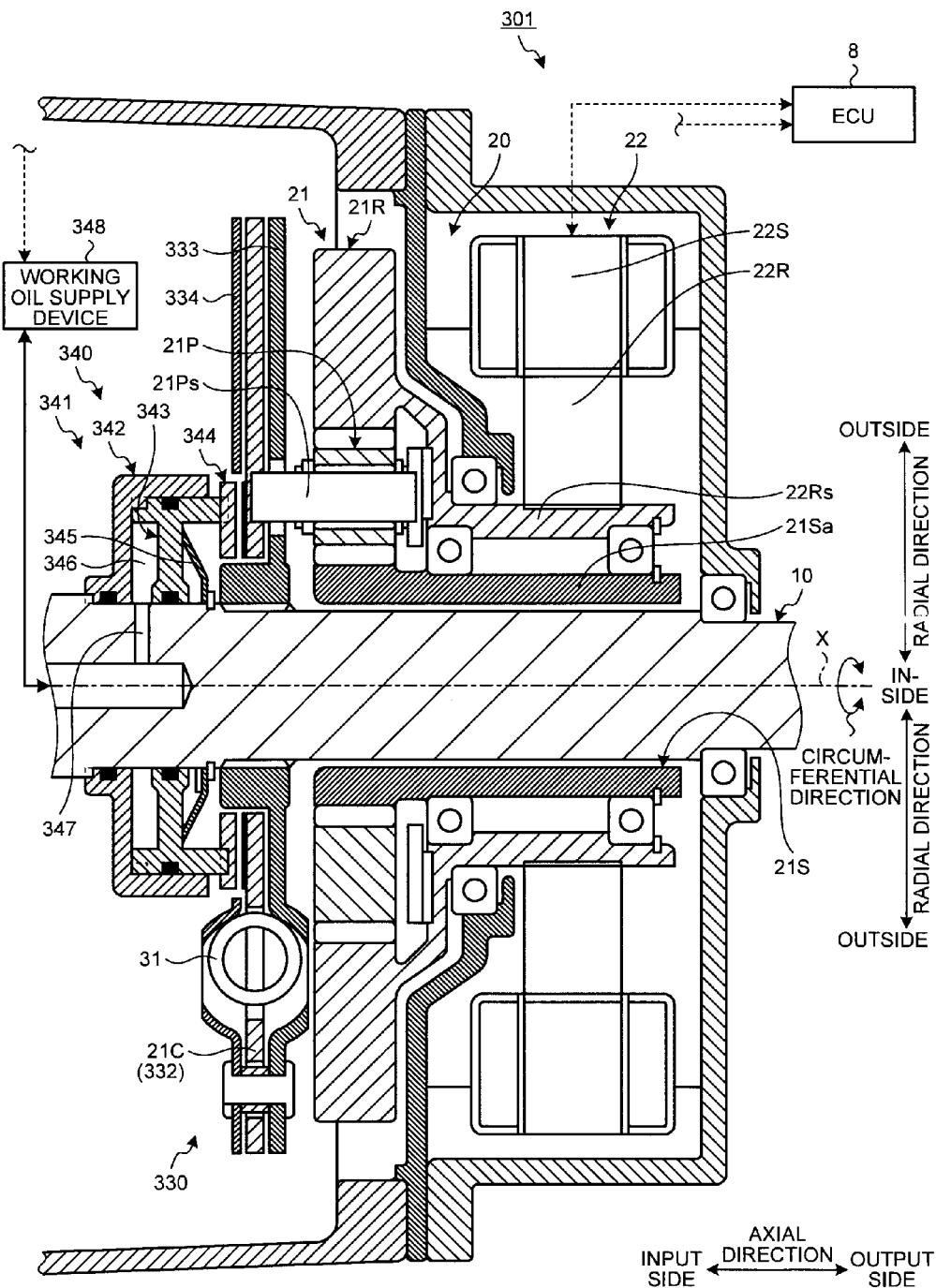
FIG. 7 is a schematic view of the configuration of a vehicle incorporating a dynamic damper device according to a third embodiment.

FIG. 7 is a schematic view of the configuration of a vehicle incorporating a dynamic damper device according to a third embodiment. The dynamic damper device according to the third embodiment differs from that according to the first embodiment in respect of the configuration of the variable damping force device.

A dynamic damper device 301 illustrated in FIG. 7 includes the variable inertial mass device 20, a spring holding mechanism 330 holding the springs 31, and a variable damping force device 340, thereby more adequately reducing vibration.

The variable damping force device 340 in the present embodiment is connected to the carrier 21C and able to connect the carrier 21C and the output shaft 10. The dynamic damper device 301 according to the present embodiment is configured such that in the variable inertial mass device 20 using the planetary gear mechanism 21, one of the rotating elements of the planetary gear mechanism 21 is used as a rotation (speed) control element, and another rotating element is provided with the variable damping force device 340 as a controllable damping element. Additionally, a rotating element identical to the damping element is used as an input element. That is, the variable damping force device 340 in the present embodiment is able to connect the carrier 21C, which is the first rotating element (input element), and the output shaft 10 without the springs 31. To be more specific, this dynamic damper device 301 is configured such that in the planetary gear mechanism 21, the damping and spring constituents of power are input to the identical rotating element, (i.e., in this embodiment, to the carrier 21C). In the planetary gear mechanism 21 in the present embodiment, the carrier 21C is the first rotating element and corresponds to the input element and damping element described above, and the ring gear 21R is the second rotating element, which is different from the first rotating element, and corresponds to the rotation control element described above.

In this embodiment, the spring holding mechanism 330 includes: springs 31: as members for holding the springs 31, a central plate 332 and first side plate 333 and second side plate 334, the central axes of which are disposed on the same rotation axis X. One end of the pinion shaft 21Ps is fixed to the central plate 332, and this central plate 332 is also used as a carrier 21C. The pinion shaft 21Ps extends through the first side plate 333 so as to allow relative rotation of the first and second side plates 333 and 334 and the central plate 332, and the pinion gear 21P is supported at the other end of this pinion shaft so as to be freely rotatable. The first and second side plates 333 and 334 are disposed on each side of the central plate 332 in the axial direction. The first side plate 333 is supported by the periphery of the output shaft 10, and its radially inside end is connected to the output shaft 10 via a spline engaging portion or the like so as to be rotatable integrally with the output shaft 10. The central plate 332 and the second side plate 334 are disposed on the first side plate 333 using a pin, spacer, etc. The first and second side plates 333 and 334 are integrally disposed with the central plate 332 between them, so as to be rotatable relative to this central plate 332. The springs 31 are held in the direction of rotation (a circumferential direction) between the central plate 332 and the first and second side plates 333 and 334.

In the spring holding mechanism 330 with the foregoing configuration, the springs 31 are interposed in the direction of rotation between the central plate 332, used as the carrier 21C as well in a rotating direction, and the first and second side plates 334 rotated integrally with the output shaft 10. Consequently, the spring holding mechanism 330 is able to connect the output shaft 10 and the carrier 21C via the springs 31, etc., such that the output shaft 10 and the carrier 21C are rotatable relative to each other. When a pressing piston device 341, described below, is not fully engaged, power (a varying constituent) transmitted to the output shaft 10 from the engine 4 is input, via the first side plate 333 and springs 331, to the central plate 332 that is used as the carrier 21C via the springs 31. During this period, while held in the direction of rotation between the first and second side plates 333 and 334 and the central plate 332, each spring 31 is elastically deformed according to the magnitude of the power transmitted thereto.

The variable damping force device 340 in the present embodiment has the pressing piston device 341 mentioned above. The pressing piston device 341 is disposed at the input side of the spring holding mechanism 330 in an axial direction. The pressing piston device 341 includes: a housing 342, a piston member 343, a friction plate 344, a return spring 345, and a pressing hydraulic chamber 346. The pressing piston device 341 is able not only to frictionally engage the carrier 21C and the friction plate 344, which is a rotating member on the side of the output shaft 10, but also to adjust the force with which they frictionally engage.

The housing 342 has a cylindrical shape with an axis identical to the rotation axis X. The housing 342 has a shape in which one side (the input side) in an axial direction is closed and the other side (the output side) is open. The housing 342 accommodates the piston member 343 inside. The housing 342 is supported on the periphery of the output shaft 10, and its radially inside end is connected to the output shaft 10 via a spline engaging portion or the like so as to be integrally rotatable with the output shaft 10. The piston member 343 has the shape of a circular plate with an axis identical to the rotation axial line X, and its radially outside portion is cylindrical. The piston member 343 is accommodated in the housing 342.

The piston member 343 is supported on the periphery of the output shaft 10, and one axial end (the input side) of its cylindrical portion is connected to the housing 342 via a notch engaging portion or the like so as to be rotatable integrally with and axially movable relative to the housing 342. The friction plate 344 has the shape of a circular plate with an axis identical to the rotation axis X. The friction plate 344 is connected to the other axial end (the output side) of the cylindrical portion of the piston member 343 so as to be rotatable and axially movable integrally with the piston member 343. In the friction plate 344, a frictional material is provided on its surface, which is axially opposite to the carrier 21C (central plate 332) (i.e., the surface on the axial output side).

The return spring 345 is provided between the piston member 343 and the spring holding mechanism 330 in an axial direction. The return spring 345 presses the piston member 343 in an axial direction so as to separate it from the central plate 332, which is also used as the carrier 21C.

Additionally, in the pressing piston device 341, seals are formed between the housing 342 and the output shaft 10, between the piston member 343 and the output shaft 10, and between the housing 342 and the piston member 343, thereby defining the pressing hydraulic chamber 346. The pressing hydraulic chamber 346 is defined in the housing 342 and opposite to the return spring 345 with the piston member 343 between them in an axial direction. That is, this pressing hydraulic chamber 346 is defined as a space on the axial input side of the piston member 343. Connected to the pressing hydraulic chamber 346 is an oil passage 347, which is connected to a working oil supply device 348. The working oil supply device 348 is used to supply working oil to the pressing hydraulic chamber 346 or to discharge working oil from the pressing hydraulic chamber 346, via the oil passage 347, etc. Driving of the working oil supply device 348 is controlled by the ECU 8.

When the working oil is supplied to the pressing hydraulic chamber 346, the pressing piston device 341 presses the piston member 343 toward the carrier 21C in an axial direction depending on the oil pressure from the working oil supplied, thereby pressing the friction plate 344 against the carrier 21C. Consequently, in the pressing piston device 341, the friction plate 344 and the carrier 21C frictionally engage by virtue of frictional force generated in the contact faces of the friction plate 344 and the carrier 21C. When the friction plate 344 and the carrier 21C are in a frictionally engaged state, the pressing piston device 341 transmits power, transmitted to the output shaft 10, to the carrier 21C via the housing 342, the piston member 343, the friction plate 344, and so on; that is, it transmits the power to the carrier 21C without the springs 31.

At this time, in the pressing piston device 341, the ECU 8 adjusts the oil pressure from the working oil supplied to the pressing hydraulic chamber 346 from the working oil supply device 348, thereby adjusting the force with which the friction plate 344 and the carrier 21C engage. Generally, the pressing piston device 341 is configured such that as the oil pressure from the working oil supplied to the oil pressure hydraulic chamber 346 increases, the force with which the piston member 343 presses the friction plate 344 against the carrier 21C and, hence, the engaging force of the friction plate 344 and the carrier 21C increase. When the engaging force is zero, the pressing piston device 341 is in a fully released state in which the friction plate 344 and the carrier 21C are fully disengaged. As the engaging force (the oil pressure from the working oil supplied to the pressing hydraulic chamber 346) increases, the friction plate 344 and the carrier 21C are brought, via a half-engaged state (slipping state), into a fully engaged state.

The variable damping force device 340 with the foregoing configuration exerts damping force control such that the ECU 8 variably controls the oil pressure from the working oil supplied to the pressing hydraulic chamber 346, in other words, the magnitude of the force with which the friction plate 344 and the carrier 21C engage, thereby variably controlling damping force for the springs 31. Consequently, in the dynamic damper device 301, the ratio of a spring constituent transmitted to the carrier 21C of the planetary gear mechanism 21 via the springs 31 to a damping constituent transmitted to the carrier 21C without the springs 31 is adjusted for the varying constituent of power transmitted to the output shaft 10.

In the variable damping force device 340, when the oil pressure from the working oil supplied to the pressing hydraulic chamber 346 is lower than a predetermined level, power transmitted by the pressing piston device 341 is zero, and power transmitted from the output shaft 10 to the carrier 21C of the variable inertial mass device 20 without the springs 31 is also zero. As a result, power transmitted to the output shaft 10 acts on the planetary gear mechanism 21, which serves as a damper mass, as a spring constituent via all the springs 31. That is, in the variable damping force device 340, when the oil pressure from the working oil supplied to the pressing hydraulic chamber 346 is lower than the predetermined level (that is, in a fully released state), damping force for the springs 31 is least.

In the variable damping force device 340, when the oil pressure from the working oil supplied to the pressing hydraulic chamber 346 may become higher than that in the fully released state, the degree of contact between the output shaft 10 and the carrier 21C of the variable inertial mass device 20 is increased, and hence the friction plate 344 and the carrier 21C are half-engaged (in a slipping state). In this case, power transmitted by the pressing piston device 341 increases depending on the oil pressure from the working oil (≈engaging force), thereby altering the magnitude of power transmitted to the carrier 21C of the variable inertial mass device 20 from the output shaft 10 without the springs 31. Consequently, according to the pressure from the working oil, some of the power transmitted to the output shaft 10 acts on the planetary gear mechanism 21, which serves as a damper mass, as a damping constituent without the springs 31, and the remainder acts on the planetary gear mechanism 21 as a spring constituent via the springs 31. That is, in the variable damping force device 340, when the pressing piston device 341 is in a half-engaged state, the damping force for the springs 31 increases with the oil pressure from the working oil supplied.

In the variable damping force device 340, when the oil pressure from the working oil supplied to the pressing hydraulic chamber 346 may become higher than that in the half-engaged state, the degree of contact between the output shaft 10 and the carrier 21C of the variable inertial mass device 20 is increased, and hence the friction plate 344 and the carrier 21C are fully engaged. In this case, power transmitted by the pressing piston device 341 increases, and hence power transmitted from the output shaft 10 to the carrier 21C of the variable inertial mass device 20 without the springs 31 becomes greatest. Consequently, all power transmitted to the output shaft 10 acts on the planetary gear mechanism 21, which serves as a damper mass, as a damping constituent without the springs 31. That is, in the variable damping force device 340, when the pressing piston device 341 is in a fully engaged state, the damping force for the springs 31 is greatest.

The ECU 8 exerts damping control by performing frequency control through the inertial mass control exerted by the variable inertial mass device 20, and amplitude magnitude control through damping force control exerted by the variable damping force device 340. As a result, the dynamic damper device 301 is easily able to exert highly accurate damping control, as described below. For example, the dynamic damper device 301 is able to exert control so accurate that efficiency of the power train 3 and suppression of vibration noise are optimal.

In the dynamic damper device 301, the ECU 8 exerts damping control by performing frequency control through the inertial mass control exerted by the variable inertial mass device 20, and frequency magnitude amplitude control through damping force control exerted by the variable damping force device 340. Thereby, vibration in reverse phase in the dynamic damper device 301 is able to be set appropriately for vibration generated in the power train 3. Accordingly, the dynamic damper device 301 is able to reduce vibration effectively in a wider range of operating areas.

According to the dynamic damper device 301 according to the present embodiment described above, the variable damping force device 340 is able to connect the carrier 21C, which serve as the first rotating element and input member, and the output shaft 10 without springs 31. Accordingly, the dynamic damper device 301 is able to render damping force for the springs 31 variable, by adjusting the quantity of the working oil supplied to the pressing piston device 341.

Additionally, this dynamic damper device 301 is able to render apparent inertial mass variable by controlling rotation of the motor 22 regardless of the difference in number of rotations between the output shaft 10 and, for example, the sun gear 21S. Accordingly, the dynamic damper device 301 is able to control rotation of the motor 22 without being subject to any limit resulting from the difference in number of rotations between the output shaft 10 and each of the rotating elements of the planetary gear mechanism 21, and is able to ensure a maximally variable range of apparent inertial mass. As a result, the dynamic damper device 301 is able to reduce vibrations optimally in substantially all ranges of normal operating areas.

It is to be understood that the dynamic damper devices according to the Embodiments described above are not limited to these, but various modifications may be made to these within the scope of the accompanying claims. Two or more dynamic damper devices according to the Embodiments described above may be also combined.

The respective control devices for the variable inertial mass device and variable damping force device share the same ECU 8. However, these devices may be provided with control devices separately, and each control device may mutually exchange information, such as a detection signal, drive signal, or control instruction, with the ECU 8.

In the description above, the variable inertial mass device variably controls apparent inertial mass by rendering the rotary speed of the damper mass variable. However the invention is not limited by this, but may variably control the actual inertial mass of the damper mass.

In the description above, the planetary gear mechanism of the variable inertial mass device uses, for example, the carrier as the first rotating element, the ring gear as the second rotating element, and the sun gear as the third rotating element. But the invention is not limited by this. The planetary gear mechanism may use, for example, the carrier, ring gear, and sun gear as the second element, third element, and first respectively, or other combinations may be used.

The description was given of the dynamic damper devices provided on the output shaft 10 where the output shaft 10 is a rotation shaft that is rotated by power transmitted from the internal combustion engine in the power train. However, the invention is not limited by this. The dynamic damper devices may be provided on a rotation shaft (acceleration shaft) rotated integrally with the output shaft 10 via, for example, a drive gear, follower gear, etc.

Industrial Applicability

The dynamic damper device according to the present invention described above may be suitably applied as a dynamic damper device incorporated in various vehicles.

Reference Signs List 1, 201, 301 DYNAMIC DAMPER DEVICE
3 POWER TRAIN
4 ENGINE (INTERNAL COMBUSTION ENGINE)
8 ECU
10 OUTPUT SHAFT (ROTARY SHAFT)
20 VARIABLE INERTIAL MASS DEVICE
21 PLANETARY GEAR MECHANISM (DAMPER MASS)
21C CARRIER (FIRST ROTATING ELEMENT, INPUT MEMBER)
21S SUN GEAR (THIRD ROTATING ELEMENT)
21R RING GEAR (SECOND ROTATING ELEMENT)
22 MOTOR (ROTATION CONTROL DEVICE)
20, 330 SPRING HOLDING MECHANISM
31 SPRING (ELASTIC BODY)
32, 332 CENTRAL PLATE
33, 333 FIRST SIDE PLATE
34, 334 SECOND SIDE PLATE
40, 240, 340 VARIABLE DAMPING FORCE DEVICE
41 ELECTROMAGNETIC CLUTCH (ENGAGING DEVICE)
43 SUN GEAR SIDE ROTATION MEMBER (ROTARY MEMBER)
44 OUTPUT SHAFT ROTATION MEMBER (ROTARY MEMBER)
241 FLUID TRANSMISSION DEVICE
243 VANE (ROTARY MEMBER)
341 PRESSING PISTON DEIVCE
342 HOUSING
343 PISTON MEMBER
344 FRICTION PLATE

The invention claimed is:

1. A dynamic damper device comprising:
a variable inertial mass device that variably controls inertial mass of a damper mass by a controller;
an elastic body that connects a rotary shaft rotated by power transmitted thereto and an input member of the variable inertial mass device; and
a variable damping force device that variably controls a damping force to the elastic body by the controller.

2. The dynamic damper device according to claim 1, wherein the dynamic damper device exerts damping control by performing frequency control through inertial mass control exerted by the variable inertial mass device, and amplitude magnitude control through damping force control exerted by the variable damping force device.

3. The dynamic damper device according to claim 1, wherein the variable damping force device is capable of connecting the rotary shaft and the variable inertial mass device without the elastic body.

4. The dynamic damper device according to claim 1, wherein the variable inertial mass device has a planetary gear mechanism including a plurality of rotating elements, which are differentially rotatable and a first rotating element of which serves as the input member, and a rotation control device connected to a second rotating element different from the first rotating element and that controls rotation of the second rotating element.

5. The dynamic damper device according to claim 4, wherein the variable damping force device is capable of connecting a third rotating element different from the first rotating element and the second rotating element, and the rotary shaft.

6. The dynamic damper device according to claim 5, wherein the variable damping force device has an engaging device capable of frictionally engaging a rotary member on a side of the third rotating element and a rotary member on a side of the rotary shaft and also capable of adjusting the force with which these rotary members engage.

7. The dynamic damper device according to claim 5, wherein the variable damping force device has a fluid transmission device capable of connecting a rotary member on a side of the third rotating element and a rotary member on a side of the rotary shaft via a fluid and also capable of adjusting a quantity of the fluid.

8. The dynamic damper device according to claim 4, wherein the variable damping force device is capable of connecting the first rotating element and the rotary shaft without the elastic body.

9. The dynamic damper device according to claim 1, wherein the rotary shaft is rotated by a power transmitted from an internal combustion engine.

10. The dynamic damper device according to claim 2, wherein the variable damping force device is capable of connecting the rotary shaft and the variable inertial mass device without the elastic body.

11. The dynamic damper device according to claim 2, wherein the variable inertial mass device has a planetary gear mechanism including a plurality of rotating elements, which are differentially rotatable and a first rotating element of which serves as the input member, and a rotation control device connected to a second rotating element different from the first rotating element and that controls rotation of the second rotating element.

12. The dynamic damper device according to claim 3, wherein the variable inertial mass device has a planetary gear mechanism including a plurality of rotating elements, which are differentially rotatable and a first rotating element of which serves as the input member, and a rotation control device connected to a second rotating element different from the first rotating element and that controls rotation of the second rotating element.

13. The dynamic damper device according to claim 2, wherein the rotary shaft is rotated by a power transmitted from an internal combustion engine.

14. The dynamic damper device according to claim 3, wherein the rotary shaft is rotated by a power transmitted from an internal combustion engine.

15. The dynamic damper device according to claim 4, wherein the rotary shaft is rotated by a power transmitted from an internal combustion engine.

16. The dynamic damper device according to claim 5, wherein the rotary shaft is rotated by a power transmitted from an internal combustion engine.

17. The dynamic damper device according to claim 6, wherein the rotary shaft is rotated by a power transmitted from an internal combustion engine.

18. The dynamic damper device according to claim 7, wherein the rotary shaft is rotated by a power transmitted from an internal combustion engine.

19. The dynamic damper device according to claim 8, wherein the rotary shaft is rotated by a power transmitted from an internal combustion engine.

* * * * *